United States Patent [19]

St. Clair et al.

[11] Patent Number: 5,428,102
[45] Date of Patent: Jun. 27, 1995

[54] LOW DIELECTRIC POLYIMIDES

[75] Inventors: Anne K. St. Clair; Terry L. St. Clair, both of Poquoson; William P. Winfree, Williamsburg, all of Va.

[73] Assignee: The United States of America as represented by the United States National Aeronautics and Space Administration, Washington, D.C.

[21] Appl. No.: 237,712

[22] Filed: May 2, 1994

Related U.S. Application Data

[63] Continuation of Ser. No. 77,166, Jun. 14, 1993, abandoned, and a continuation of Ser. No. 952,120, Sep. 28, 1992, abandoned, which is a continuation-in-part of Ser. No. 376,482, Jul. 7, 1989, abandoned, which is a continuation-in-part of Ser. No. 73,542, Jul. 15, 1987, abandoned.

[51] Int. Cl.$^6$ .................... C08G 73/10; C08L 79/68
[52] U.S. Cl. ................... 524/600; 524/602; 524/606; 524/607; 528/125; 528/128; 528/172; 528/173; 528/176; 528/183; 528/185; 528/188; 528/220; 528/229; 528/350; 528/353

[58] Field of Search ............... 528/353, 350, 125, 128, 528/172, 173, 176, 183, 185, 188, 220, 229; 524/600, 607, 606, 602

[56] References Cited

U.S. PATENT DOCUMENTS

| 4,111,906 | 9/1978 | Jones et al. | 528/229 |
| 4,595,548 | 6/1986 | St. Clair et al. | 528/183 |
| 4,603,061 | 7/1986 | St. Clair et al. | 428/473.5 |
| 4,645,824 | 2/1987 | Landis et al. | 528/353 |
| 4,837,300 | 6/1989 | St. Clair et al. | 528/353 |
| 4,895,972 | 1/1990 | Stoakley et al. | 528/353 |

FOREIGN PATENT DOCUMENTS 1062435  3/1967  United Kingdom .

*Primary Examiner*—Paul R. Michl
*Assistant Examiner*—Pat Hightower
*Attorney, Agent, or Firm*—George F. Helfrich

[57] ABSTRACT

A series of polyimides based on the dianhydride of 1,4-bis(3,4-dicarboxyphenoxy)benzene (HQDEA) or on 2,2-bis[4(3-aminophenoxy)phenyl]hexafluoropropane (3-BDAF) are evolved from high molecular weight polyamic acid solutions yielding flexible free-standing films and coatings in the fully imidized form which have a dielectric constant in the range of 2.5 to 3.1 at 10 GHz.

7 Claims, No Drawings

LOW DIELECTRIC POLYIMIDES

ORIGIN OF THE INVENTION

The invention described herein was made by employees of the United States Government and may be manufactured and used by or for the Government for governmental purposes without the payment of any royalties thereon or therefor.

CROSS-REFERENCE

This is a continuation of application Ser. No. 08/077,166, filed Jun. 14, 1993, now abandoned, and application Ser. No 07/952,120, filed on Sep. 28, 1992, (now abandoned), which is a continuation-in-part of application Ser. No. 07/376,482, filed Jul. 7, 1989, now abandoned which is a continuation-in-part of application Ser. No. 07/073,542, filed Jul. 15, 1987, now abandoned.

BACKGROUND OF THE INVENTION

1. Field of the Invention

The present invention relates generally to high-temperature, low dielectric polyimides. It relates particularly to aromatic polyimides which contain 1,3-bis(3,4-dicarboxyphenoxy)benzene in the dianhydride portion and 2,2-bis[4(3-aminophenoxy)phenyl]hexafluoropropane as the diamine portion of the polymer structure.

2. Description of the Related Art

High performance film and coating materials are being used increasingly by the electronic circuit industry. As cited by Senturia (*Proc. of ACS Polym. Matls. Sci. and Eng.*, Vol. 55, 385, 1986), there are four primary applications in the area of microelectronics: (1) as fabrication aids such as photoresists, planarization layers, and ion implant masks; (2) as passivant overcoats and interlevel insulators; (3) as adhesives, and (4) as substrate components. Of utmost importance for the performance of a polymer used for electronic applications is its electrical behavior. To be useful, particularly as a passivant or protective overcoat, the material must be an excellent insulator.

U.S. Pat. No. 4,111,906 (Jones et al.) is directed to a novel aromatic diamine and the use of this diamine in the preparation of polymeric materials including polyimides. However, this reference is not concerned with the preparation of polymers having low dielectric constants.

U.S. Pat. No. 4,645,824 (Landis et al.) is directed to a solvent polycondensation process for preparing high molecular weight polyimides from dianhydrides and diamines. However, this reference is not concerned with the preparation of polymers having low dielectric constants.

Great Britain 1,062,435 is directed to the preparation of polyimides which are useful in the preparation of shaped structures such as films, fibers, filaments, foams, and the like. Like Jones and Landis discussed above, this references does not even mention the dielectric constant of the polyimides produced.

The dielectric constant of commercially available polyimides presently used as state-of-the-art materials for passivants and interlevel dielectrics ranges from approximately 3.2 to 4.0 (depending on frequency and moisture content). The lower limit of 3.2 is obtained on commercial polyimide film, DuPont Kapton ® H film, only after being fully desiccated. Unfortunately, as the film or coating absorbs moisture, the dielectric constant rises, making measurements and operation of electronic devices complicated.

Accordingly, a primary object of the present invention is to provide what is not available in the art, viz., a polyimide composition which exhibits a lowered dielectric constant in the range of 2.5 to 3.1 at 10 GHz.

Another object of the present invention is to provide a series of polyimides based on the dianhydride of 1,4-bis(3,4-dicarboxyphenoxy)benzene (HQDEA) that are evolved from high molecular weight polyamic acid solutions and that yield flexible free-standing films and coatings in the fully imidized form.

Another object of the present invention is to provide a series of polyimides based on 2,2-bis[4(3-aminophenoxy)phenyl]hexafluoropropane (3-BDAF) that are evolved from high molecular weight polyamic acid solutions and that yield flexible free-standing films and coatings in the fully imidized form.

Another object of the present invention is to provide a polyimide based on the HQDEA dianhydride and 3-BDAF diamine.

Another object of the present invention is to provide a polyimide composition based on HQDEA which exhibits a lowered dielectric constant, compared to the state-of-the-art commercial polyimides, in the range of 2.5 to 3.1 at 10 GHz.

Another object of the present invention is to provide a polyimide composition which exhibits a lowered dielectric constant, compared to the state-of-the-art commercial polyimides, in the range of 2.5 to 3.1 at 10 GHz.

Another object of the present invention is to make films or coatings materials from polymers based on HQDEA and/or 3-BDAF.

SUMMARY OF THE INVENTION

By the present invention, high-temperature stable aromatic condensation polyimide films and coatings are produced which have dielectric constants in the range of 2.5 to 3.1. These materials are better electrical insulators than state-of-the-art commercial polyimides. Several of these low dielectric polyimides have excellent resistance to moisture. These low dielectric polyimides are highly suitable as film and coating materials for both industrial and aerospace applications where high electrical insulation, moisture resistance, mechanical strength and thermal stability are required.

The polyimides of the present invention are prepared by reacting 1,4-bis(3,4-dicarboxyphenoxy)benzene dianhydride (HQDEA)

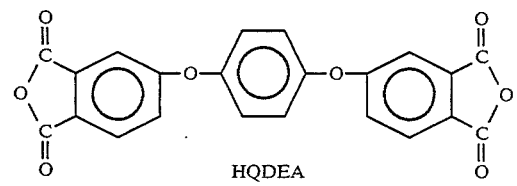

HQDEA with the following aromatic diamines

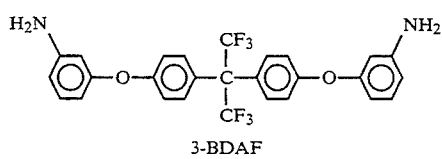

3-BDAF

-continued

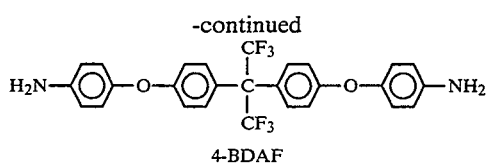
4-BDAF

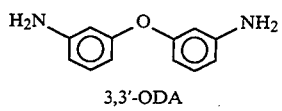
3,3'-ODA

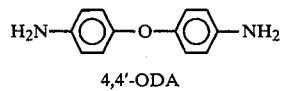
4,4'-ODA

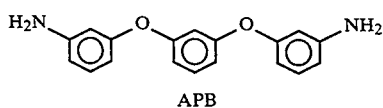
APB

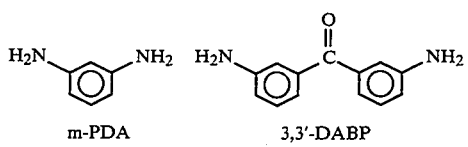
m-PDA         3,3'-DABP to provide the corresponding polyimide polymers, or by reacting 2,2-bis[4(3-aminophenoxy)phenyl]hexafluoropropane (3-BDAF) with the following aromatic dianhydrides to provide the corresponding polyimide polymers

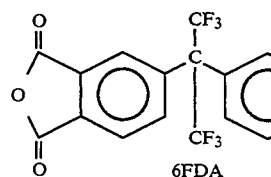 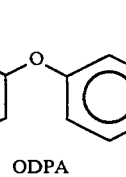
6FDA          ODPA

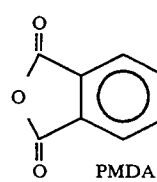 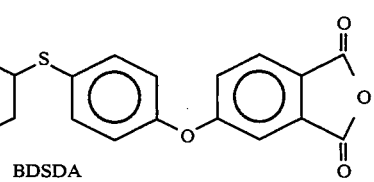
PMDA          BDSDA

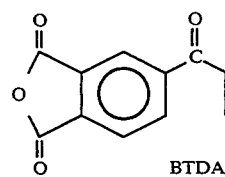 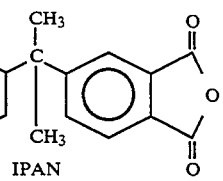
BTDA          IPAN

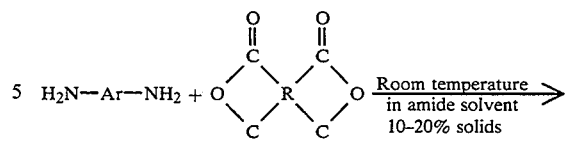

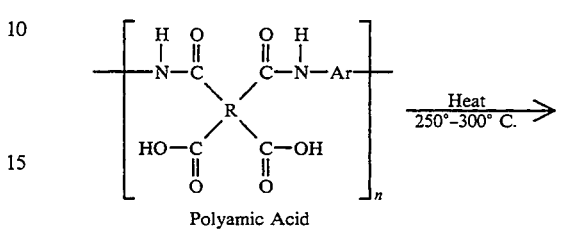
Polyamic Acid

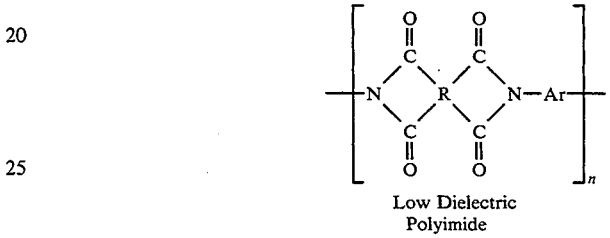
Low Dielectric Polyimide where n is 5 to 100 and where Ar is

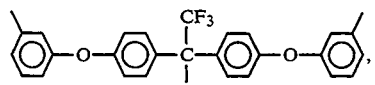
3-BDAF

Description of the Preferred Embodiments

Preparation of low dielectric polyimide films and coatings of the present Invention Involves the reaction of an aromatic diamine in a solvent with an aromatic dianhydride according to the following scheme:

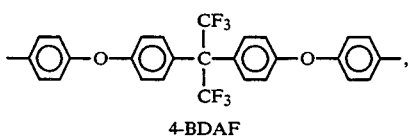
4-BDAF

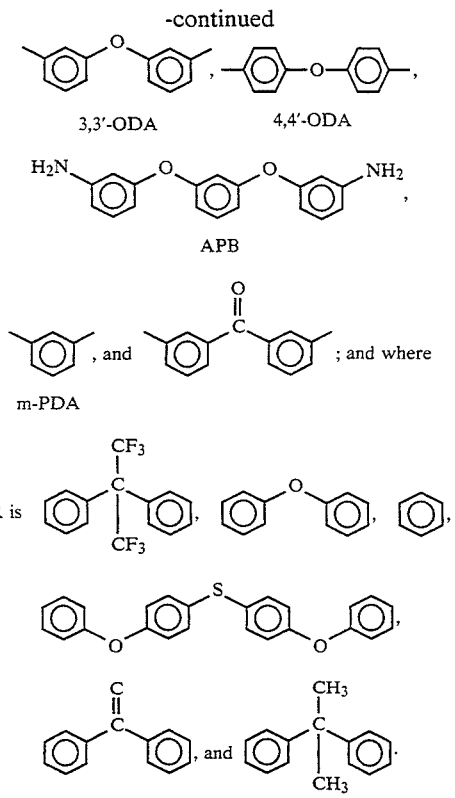

In the above reaction, a polymer grade aromatic diamine is dissolved in a dry amide type solvent such as dimethylacetamide (DMAc). A polymer grade aromatic dianhydride is then added to the diamine solution at room temperature to from a polyamic acid. This resin is then spread onto a glass plate to form a film using a doctor blade with specified blade gap. The polyamic acid film is then thermally converted to the polyimide by heating to 250°–300° C.

Although the diamines displayed in the summary section of this disclosure were used with the dianhydride HQDEA as examples to provide low dielectric polymers of this invention, other aromatic diamines could foreseeably be used to reach the same end.

Although the dianhydrides displayed in the summary section of this disclosure were used with the diamine 3-BDAF to provide the low dielectric polymers of this invention, other aromatic dianhydrides could foreseeably be used to reach the same end.

Although DMAc was used a the solvent medium to prepare the polyamic acids in the examples of this invention, other solvents could foreseeably be used such as N,N-dimethylformamide, tetrahydrofuran, or 1-methyl-2-pyrrolidinone. These solvents would also produce high quality films of the polyimides herein.

SPECIFIC EXAMPLES

Example I

A diamine solution was prepared by mixing a said amount of 2,2-bis[4(3-aminophenoxy)phenyl]hexafluoropropane (3-BDAF) together with enough dry dimethylacetamide (DMAc) to produce a 15% solids (by weight) polymer solution. Upon dissolution of the diamine, an equimolar amount 1,4-bis(3,4-dicarboxyphenoxy) benzene dianhydride (HQDEA) was added. The solution was stirred until all solids were dissolved (8–24 hours) and a viscous polyamic acid was formed. The inherent viscosity of the HQDEA+3-BDAF solution was 0.46 dLg at 35° C. The resulting polyamic acid solution was refrigerated until used for film casting.

A film of the polyamic acid was cast to a thickness of approximately 15 mil on a soda-lime glass plate in a low humidity, dust-free chamber (relative humidity=10%). The film was heated for one hour each at 100, 200° and 300° C. in a flowing air oven to convert the polyamic acid film to the corresponding polyimide. The resulting pale yellow to colorless film was removed from the glass plate after cooling to room temperature by immersing in luke warm water. The film was tough and flexible and had a dielectric constant of 2.71 at 10 GHz and 35% relative humidity.

Example II

By the same method and conditions described in Example I of the present invention, equimolar amounts of 2,2-bis[4(4-aminophenoxy)phenyl]hexafluoropropane (4-BDAF) and HQDEA were dissolved in DMAc to form a polyamic acid having an inherent viscosity of 1.0 dLg. The resulting polyimide film was pale yellow and flexible having a dielectric constant of 2.56 at 10 GHz.

Example III

By the same method and conditions described in Example I of the present invention, equimolar amounts of 4,4'-oxydianiline (4,4'-ODA) and HQDEA were dissolved in DMAc to form a polyamic acid having an inherent viscosity of 0.7 dLg. The resulting flexible film was pale yellow and had a dielectric constant of 3.02 at 10 GHz.

Example IV

By the same method and conditions described in Example I of the present invention, equimolar amounts of 3,3'-oxydianiline (3,3'-ODA) and HQDEA were dissolved in DMAc to form a polyamic acid having an inherent viscosity of 0.42 dLg. The resulting flexible, pale-yellow film had a dielectric constant of 2.88 at 10 GHz.

Example V

By the same method and conditions described in Example I of the present invention, equimolar amounts of meta-phenylenediamine (m-PDA) and HQDEA were reacted in DMAc to form a polyamic acid having an inherent viscosity of 0.60 dLg. The resulting pale colored, flexible film had a dielectric constant of 3.09 at 10 GHz. 10

Example VI

By the same method and conditions described in Example I of the present invention, equimolar amounts of 1,3-bis(aminophenoxy)benzene (APB) and HQDEA were combined in DMAc to form a polyamic acid having an inherent viscosity of 0.53 dLg. The resulting pale-colored film was flexible and had a dielectric constant of 2.89 at 10 GHz.

Example VII

By the same method and conditions described in Example I of the present invention, equimolar amounts of 3,3'-diaminobenzophenone (3,3'-DABP) and HQDEA were combined in DMAc to form a polyamic acid having an inherent viscosity of 0.71 dLg. The resulting pale yellow film was flexible and had a dielectric constant of 3.06 at 10 GHz.

Example VIII

By the same method and conditions described in Example I of the present invention, 2,2-bis(3,4-dicarboxyphenyl)hexafluoropropane dianhydride (6FDA) and 3-BDAF were reacted together in DMAc to form a polyamic acid having an inherent viscosity of 0.53 dLg. The resulting 6FDA+ 3-BDAF polyimide film was pale to colorless and flexible having a dielectric constant of 2.40 at 10 GHz. The dielectric constant of this polymer changed very little after being exposed to 100% relative humidity for 24 hours.

Example IX

By the same method and conditions described in Example I of the present invention, equimolar amounts of 4,4'-oxydiphthalic anhydride (ODPA) and 3-BDAF were combined in DMAc to form a polyamic acid having an inherent viscosity of 0.54 dLg. The resulting pale yellow film was flexible and had a dielectric constant of 2.70 at 10 GHz and 3.09 at 1 MHz.

Example X

By the same method and conditions described in Example I of the present invention, equimolar amounts of pyromellitic dianhydride (PMDA) and 3- BDAF were dissolved in DMAc to form a polyamic acid having an inherent viscosity of 0.81 dLg. The resulting pale yellow film was flexible and had a dielectric constant of 2.60 at 10 GHz.

Example XI

By the same method and conditions described in Example I of the present invention, equimolar amounts of 4,4'-bis(3,4-dicarboxyphenoxy)diphenyl sulfide dianhydride (BDSDA) and 3-BDAF were dissolved in DMAc to form a polyamic acid having an inherent viscosity 0.63 dLg. The resulting pale yellow film was flexible and had a dielectric constant of 2.76 at 10 GHz.

Example XII

By the same method and conditions outlined in Example I of the present invention, equimolar amounts of 3,3',4,4'-benzophenone tetracarboxylic dianhydride (BTDA) and 3-BDAF were dissolved in DMAc to form a polyamic acid having an inherent viscosity of 0.58 dLg. The resulting light yellow film had a dielectric 2.60 at 10 GHz.

Example XIII

By the same method and conditions outlined in Example I of the present invention, equimolar amounts of isopropylidene diphthalic anhydride (IPAN) and 3-BDAF were dissolved in DMAc to form a polyamic acid having an inherent viscosity of 0.48 dLg. The pastel yellow film was creasable and had a dielectric constant of 2.58 at 10 GHz.

We claim:

1. A low dielectric polymer composition comprising a linear aromatic polyimide formed as the reaction product of 2,2-bis[4(3-aminophenoxy)phenyl]hexafluoropropane and 1,4-bis(3,4-dicarboxyphenoxy)benzene dianhydride, the linear aromatic polyimide having the following general structural formula:

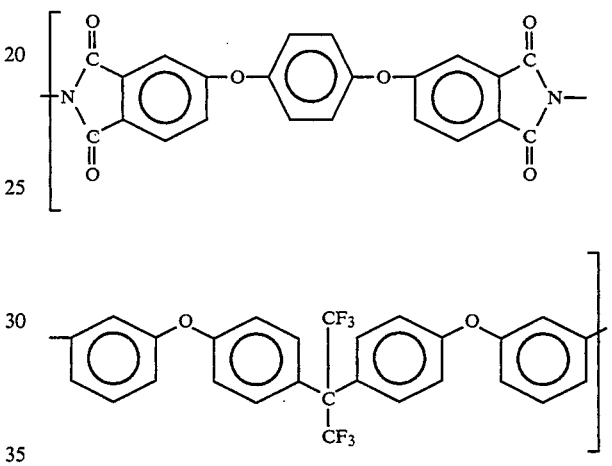

where n is 10–100.

2. A low dielectric polymer composition having the following general structural formula:

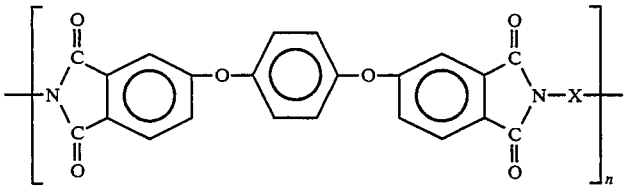

where n is 10–100, the low dielectric polymer composition comprising a linear aromatic polyimide formed as the reaction product of 1,4-bis(3,4-dicarboxyphenoxy)benzene dianhydride and an aromatic diamine selected from the group consisting of:
 2,2-bis[4(4-aminophenoxy)phenyl]hexafluoropropane,
 4,4'-oxydianiline,
 3,3'-oxydianiline,
 1,3-bis(aminophenoxy)benzene, and
 3,3'-diaminobenzophenone.

3. A low dielectric polymer composition having the following general structural formula:

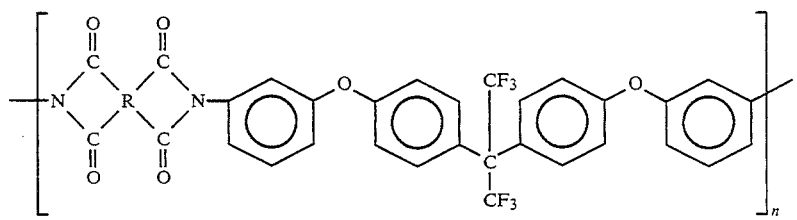

where n is 10–100, the low dielectric polymer composition comprising a linear aromatic polyimide formed as the reaction product of 2,2-bis[4(3-aminophenoxy)-phenyl]hexafluoropropane with an aromatic dianhydride selected from the group consisting of:
2,2-bis(3,4-dicarboxyphenyl)hexafluoropropane dianhydride,
4,4'-oxydiphthalic anhydride,
pyromellitic dianhydride,
4,4'-bis(3,4-dicarboxyphenoxy)diphenyl sulfide dianhydride,
3,3'-4,4'-benzophenone tetracarboxylic dianhydride,
and isopropylidene diphthalic anhydride.

4. A film prepared from a polyimide according to claim 2.

5. A coating prepared from a polyimide according to claim 2.

6. A film prepared from a polyimide according to claim 3.

7. A coating prepared from a polyimide according to claim 3.

* * * * *